(12) United States Patent
MP (10) Patent No.: US 11,442,758 B2
(45) Date of Patent: Sep. 13, 2022

(54) INTEGRATION FLOW EXECUTION RENEW (71) Applicant: SAP SE, Walldorf (DE)

(72) Inventor: Deepak MP, Bangalore (IN)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 17/140,603

(22) Filed: Jan. 4, 2021

(65) Prior Publication Data
US 2022/0214899 A1 Jul. 7, 2022

(51) Int. Cl.
G06F 9/455 (2018.01)
G06F 9/54 (2006.01)
G06F 16/25 (2019.01)

(52) U.S. Cl.
CPC ............ *G06F 9/45516* (2013.01); *G06F 9/54* (2013.01); *G06F 16/25* (2019.01)

(58) Field of Classification Search
CPC ................................ G06F 9/45516; G06F 9/54
See application file for complete search history.

(56) References Cited

U.S. PATENT DOCUMENTS 10,552,180 B2 * 2/2020 Baneva ............ G06Q 10/06311
10,608,892 B2 * 3/2020 Savov ................. H04L 67/2804
2012/0227044 A1 * 9/2012 Arumugham .......... G06Q 10/06 718/100
2014/0344817 A1 * 11/2014 Jovanovic ............. G06F 9/5066 718/102
2017/0134519 A1 * 5/2017 Chen ....................... H04L 67/32

* cited by examiner

*Primary Examiner* — Marina Lee
(74) *Attorney, Agent, or Firm* — Buckley, Maschoff & Talwalkar LLC (57) ABSTRACT A method and system including receiving a set of integration steps to transfer data between a first application and a second application, wherein the set of integration steps includes execution of at least one component; transmitting the received set of integration steps to a blueprint generator; converting, at the blueprint generator, the received set of integration steps to a binary runtime executable code; inserting at least two input/output interceptors into the binary runtime executable code; receiving the binary runtime executable code at a runtime component; executing the received binary runtime executable code at the runtime component using data, in a case that execution of the at least one component is complete, an output of the executed at least one component is saved; in a case that execution of the at least one component is incomplete: receiving an update to the data; re-generating, at the blueprint generator, the binary runtime executable code for one or more an unexecuted integration steps; and executing the re-generated binary runtime executable code. Numerous other aspects are provided.

20 Claims, 8 Drawing Sheets

INTEGRATION FLOW EXECUTION RENEW

BACKGROUND

Cloud integration refers to the combination of tools, technologies and practices an organization may use to connect applications, systems, data, and entire information technology environments, where at least one party is cloud-based. For example, such integration may occur between different cloud providers, platforms and applications, as well as between cloud-hosted and local or on-premises resources. A common form of cloud integration is data integration, which aims to share or synchronize data between data stores. Another type of cloud integration is application integration, where two or more applications can share states, requests, commands and other mechanisms to implement processes.

In a cloud environment, to integrate two (or more) systems, a user may design a set of integration steps to allow the data from one system to be shared or synchronized with another system. Often the data shared between the systems may include many records (e.g., millions of records, etc.). However, during execution of the integration steps, at least one of the integration steps may fail for reasons outside of the control of the user. This failure may occur at any point during the execution (e.g., after ten percent of the records have processed, fifty percent of the records have processed, ninety percent of the records have processed, etc.). In addition to the failure being undesirable because the integration was not completed, the failure is also problematic as the outlay of time and effort to rectify the issues and re-process the appropriate records may be very large.

Systems and methods are desired which support efficient rectification of data integration failures.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

During cloud platform integration (CPI) to integrate applications, two or more applications can be integrated to share data related to the states, requests, commands and other mechanisms to implement processes. For each element shared between the applications, integration steps may be created to share the data. For example, if System A wants to communicate/share data with system B via an HTTP protocol, and system B communicates/shares data via an OData protocol, there may be a problem in that these protocols may not be compatible. The integration steps may be used to allow the two systems to communicate with each other. Further, each set of integration steps may be different, depending on the complexity of the scenario that is modelled by the steps and the amount of data that is being processed. To that end, each set of integration steps may need a different amount of resources (e.g., memory and Computer Processing Unit (CPU) processing time).

A user may design the integration steps that allow the two systems to communicate with each other. After designing the integration steps, the user may deploy these steps on to a Tenant (e.g., Virtual machine) for execution thereof (i.e., to have the two systems communicate with each other). The inventor notes that the integration may be of two systems or two applications. During execution, data is pulled from a source system. Then the data is enriched, and transformation logic is applied thereto, per the integration steps. When the enrichment and transformation is complete, the enriched and transformed data is sent to the target system. Often the integration steps are applied to a large volume of data, including but not limited to, millions or records.

During execution of the integration steps, and in particular during the enrichment and transformation of the source data, one of the integration steps may experience a failure. The failure may be due to reasons beyond the control of the user, including but not limited to, mandatory fields missing in the data, data corruption, encoded data in the source system that cannot be understood by the integration steps, etc. This failure may occur at any point during the execution (e.g., after ten percent of the records have processed, fifty percent of the records have processed, ninety percent of the records have processed, etc.). This failure may be very undesirable. For example, consider a scenario where the integration steps are to be executed for a million records, which may take twenty-four hours, and the failure occurs after only half of the records have been processed.

Conventionally, after the user is alerted of the failure, the user may begin a cumbersome set of correction steps. These steps may include checking in the target system to determine how many records were processed, fetching the identifiers for those processed records, going into the source system and determining a way to exclude these records from being processed again. Next, the user may identify which record resulted in the failure of the integration flow execution, and may correct this data in the source system. Then the integration flow may be re-run from the beginning, excluding the records that were already processed. This re-run may take another twenty-four hours. It is noted that during the re-run, one of the integration steps (the same step or another step), may experience a failure, and the user may need to perform all of the above correction steps again. Any number of records may result in any number of additional failures during the execution of the integration. As such, conventionally when an integration step fails during execution, it may take a lot of time and effort to rectify the issue and re-process the records. It is further noted that in a case that the data records being integrated are employee salaries or other time-critical records, failure of the integration and rectifying the errors may be very challenging.

Embodiments provide an integration flow (IF) renew module to address these problems. In embodiments, the IF renew module inserts interceptors into the executable code to check/verify the input and output of each component in the integration flow. The interceptors may allow the IF renew module to determine where a failure in execution of the intergration flow occurred. For example, if a given component has an input but does not have an output, the integration step failed at that component. When a failure location is determined, the IF renew module may present the failure data to a user, thereby allowing the user to focus on the location of the error and provide a targeted correction, without having to first sift through all of the possible places the error may have occurred. The IF renew module may next receive a correction/adjustment from the user. The interceptor points may also save the last good data—whether it is the input to the component or the output of the component, so that the integration flow may be re-executed from the point of failure, instead of re-executing the integration flow from the beginning.

As used herein, an integration flow may be formed from one or more "integration steps." In the embodiments described herein, a graphical tool may be used to configure the integration steps (e.g., specify how the two or more different applications can integrate), and this set of integration steps may be referred to as an "integration flow" or "iflow," but any suitable configuration process may be used.

Figure 1:
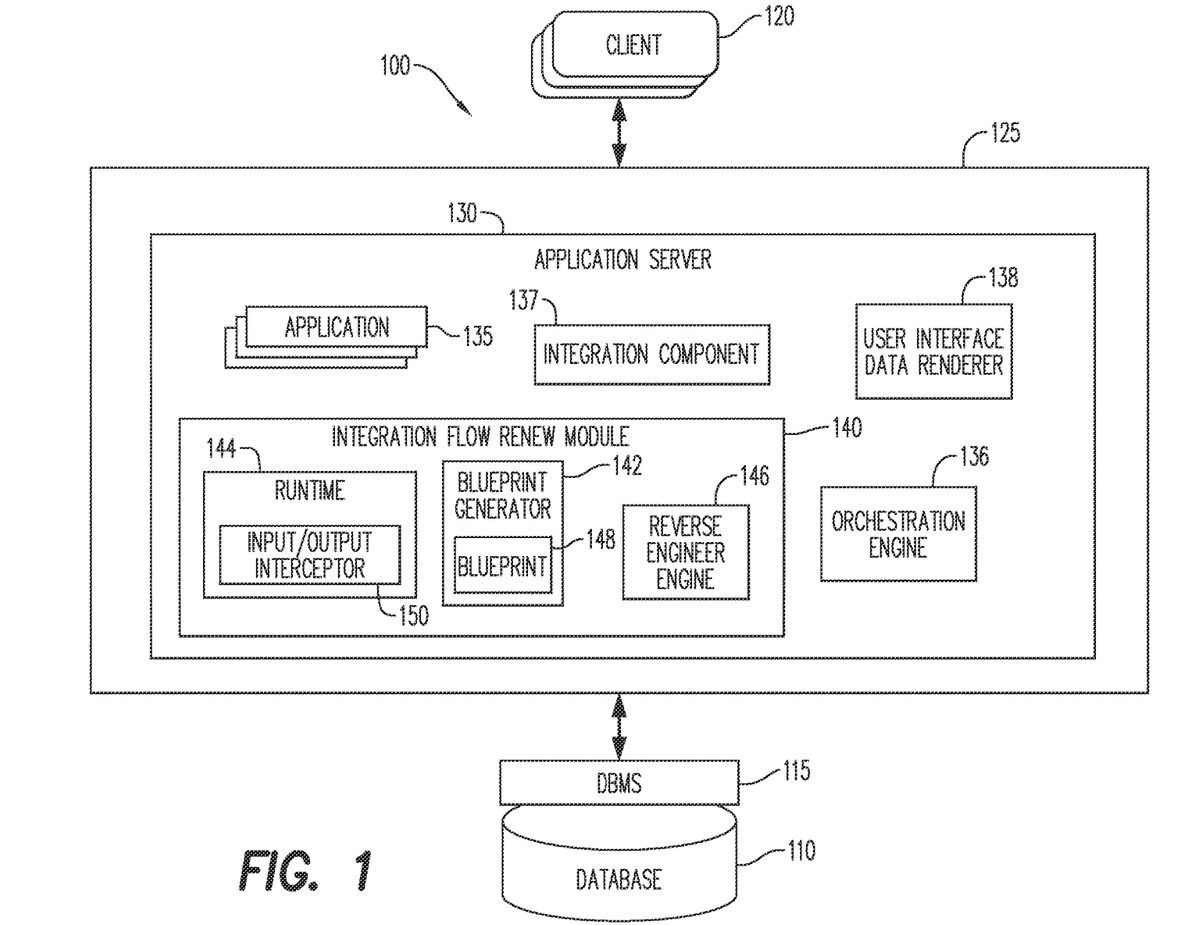
FIG. 1 is a block diagram of a system architecture according to some embodiments.

FIG. 1 is a block diagram of system architecture 100 according to some embodiments. Embodiments are not limited to architecture 100 or to a three-tier database architecture.

Architecture 100 includes database 110, database management system or service (DBMS) 115, a client 120, software architecture 125 including an application server 130, applications 135, an orchestration engine 136, a User Interface (UI) data renderer 138 and an Integration Flow (IF) renew module 140. The IF renew module 140 may include a blueprint generator 142, a runtime component 144, and a reverse engineer engine 146. Applications 135 may comprise server-side executable program code (e.g., compiled code, scripts, etc.) executing within application server 130 to receive queries from clients 120 and provide results to clients 120 based on data of database 110 per the DBMS 115. Once the integration steps are executed, different applications may be able to communicate with each other, which may facilitate organizational operations.

Figure 4:
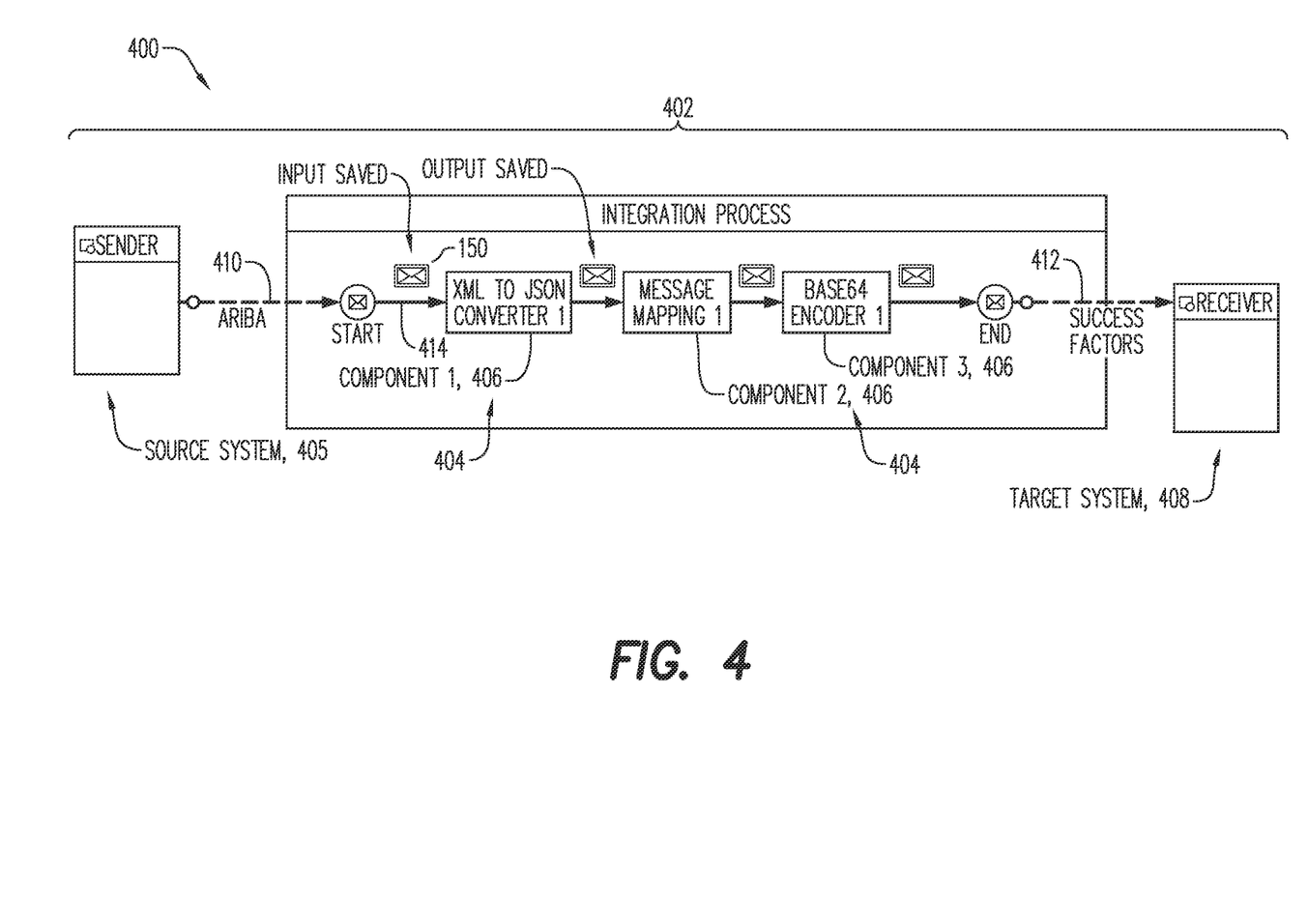
FIG. 4 is a user interface according to some embodiments.

In the example architecture of FIG. 1, the software architecture 125 may include an application server 130. Application server 130 provides any suitable interfaces through which clients 120 may communicate with the IF renew module 140 or applications 135 executing on application server 130. The application server 130 may include an integration component 137. The integration component 137 may be a program tool executed by a user to connect a cloud system/application with other cloud and on-premises systems/applications. The integration component 137 may be referred to as an "Integration Flow Editor" and may provide a user interface 400 that allows the user 302 to create an integration flow 402 including the integration steps 404 to move data from a source system 405 to a target system 408.

One or more applications 135 executing on server 130 may communicate with DBMS 115 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 115 serves requests to retrieve and/or modify data of database 110, and also performs administrative and management functions. Such functions may include snapshot and backup management, indexing, optimization, garbage collection, and/or any other database functions that are or become known. DBMS 115 may also provide application logic, such as database procedures and/or calculations, according to some embodiments. This application logic may comprise scripts, functional libraries and/or compiled program code.

Application server 130 may be separated from, or closely integrated with, DBMS 115. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by at least one of: applications 135 and the IF renew module 140. For example, database 110 may store data values that may be used by the IF renew module 140 during the execution thereof.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 120 may comprise one or more individuals or devices executing program code of a software application for presenting and/or generating user interfaces to allow interaction with application server 130 and the database 110. Presentation of a user interface as described herein may comprise any degree or type of rendering, depending on the type of user interface code generated by application server 130. It is noted that while the UI data renderer 138 is shown residing on the server 130 in FIG. 1, the UI data renderer may reside on the individual client 120, and may be in electronic communication with the application server 130.

For example, a client 120 may execute a Web Browser to request and receive a Web page (e.g., in HTML format) from a website application 135 of application server 130 to access the IF renew module 140 via HTTP, HTTPS, and/or Web Socket, and may render and present the Web page according to known protocols. The client 120 may also or alternatively present user interfaces by executing a standalone executable file (e.g., an .exe file) or code (e.g., a JAVA applet) within a virtual machine.

FIGS. 2-5 include a flow diagram of a process 200 (FIG. 2) and a block diagram 300 of the same process for addressing a failure in an execution of an integration flow according to some embodiments. Process 200 may be executed by the software architecture 125 according to some embodiments. In one or more embodiments, the software architecture 125 (e.g., application server 130) may be conditioned to perform the process 200, such that a processor 610 (FIG. 6) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interfaces 400, 500 (FIGS. 4, 5) may be presented on any type of display apparatus (e.g., desktop monitor, smartphone display, tablet display) provided by any type of device (e.g., desktop system, smartphone, tablet computer). One or more embodiments may include the UI renderer 138 which is executed to provide user interface 400, 500 and may comprise a Web Browser, a standalone application, or any other application. Embodiments are not limited to user interface 400, 500 of FIGS. 4, 5.

Initially, at S210 a user 302 initiates an integration component 137. In one or more embodiments, the integration component 137 may be an integration application (e.g., SAP Cloud Platform Integration, Dell Bhoomi, Tibco, etc.) or other suitable integration component. The integration component 137 may be used to connect cloud systems/applications (e.g., source cloud application) with other cloud and on-premises systems/applications (target/receiver or destination applications). The user 302 may then be presented with a graphical user interface 400 (FIG. 4) and may design the integration steps 404 of the integration flow 402 in S212.

In one or more embodiments, the user 302 may select a source cloud application 410 which may be integrated with a target application 404. As shown in the non-exhaustive example in FIG. 4, the source cloud application 410 may be provided by an SAP Ariba® source system 405, or another suitable source, and the target cloud application 412 may be an SAP Successfactors® system, or any other suitable target 408. In one or more embodiments, the integration flow 402 may include one or more user-selectable components 406 to perform the one or more integration steps 404 of the integration flow 402. The component 406 may be a piece of software which has a specific role/task. The component may include code to complete the role/task. In the non-exhaustive example in FIG. 4, the components 406 include an XML to JSON Converter 1 component, a Message Mapping Component and a Base64 Encoder 1 component. For example, mapping steps convert the data from the source cloud application 412. It is noted that the source and target applications may be different and may not understand the data that is transferred between them. As such, the integration flow 402 transforms the data via the mapping step. Once the data is transformed, it may be sent to the target system 408. In particular the message mapping converter 406 may convert data in one format (e.g. XML) to another format to be transmitted to (integrated with) the target application 412. In one or more embodiments, the message mapping converter 406 may transform the data files into a format or protocol used by the target application 412. It is noted that there are different types of converters like XML to CSV converters (Converts an XML to CSV file), XML to JSON converters (Converts XML to JSON file), etc. All of these converters copy the data as-is from one format to another format. Message Mapping, on the other hand, not only does conversion but also does transformation. For example, with transformation, one can concatenate First Name and Last Name from source and send it as one field to the target. Non-exhaustive examples of components 406 include an XML to JSON converter component; a message mapping component, a base64 encoder component, an enricher component etc.

After the user 302 has completed designing the integration flow 402, the user 302 selects an execution selector (not shown) to execute the integration flow 402 in S214. When execution of the integration flow 402 is initiated, the integration flow 402 is received at a blueprint generator 142 of the IF renew module 140. As Apache Camel Integration framework deployed in Apache Karaf Container, or other suitable framework, may not understand the information in the user interface 400, the blueprint generator 142 converts the integration steps 404 forming the integration flow 402 into a binary code blueprint 148 (binary runtime executable code) at S215, where the binary code blueprint 148 has a binary format that is understandable by a runtime component 144, including, but not limited to JavaRuntime. As a non-exhaustive example, the blueprint generator 142 may convert the integration flow 402 into an Apache camel blueprint 148. In one or more embodiments, when the blueprint generator 142 converts the integration flow 402 into the blueprint 148, the blueprint generator 142 may insert one or more input/output interceptors 150 into the binary code blueprint 148. The input/output interceptor 150 may verify/check for the existence of an input and the existence of an output. The input/output interceptor 150 is code that may be called before input is sent to a component and called after output is generated by a component. The calling of this code may be an automatic process. The blueprint generator 142 may inject the input/output interceptor 150 while converting the integration flow 402 to the binary code blueprint 148. As shown in the non-exhaustive example of FIG. 4, a first input/output interceptor 150 saves the input 414 to component 1 at a datastore 110, and a second input/output interceptor 150 saves the output 416 of component 1 at the datastore 110. The datastore 110 may be a database, or any other suitable data storage medium. It is noted that the output of component 1 is the input to component 2, so the second input/output interceptor also saves the input of component 2, etc.

Next, a runtime component 144 receives the blueprint 148 at S216 and executes the integration steps 404 represented by the blueprint 148. Execution of the blueprint 148 is execution of the integration steps of integration flow 402 in a format understandable by Apache Camel Integration framework, or other suitable framework.

Figure 2A:
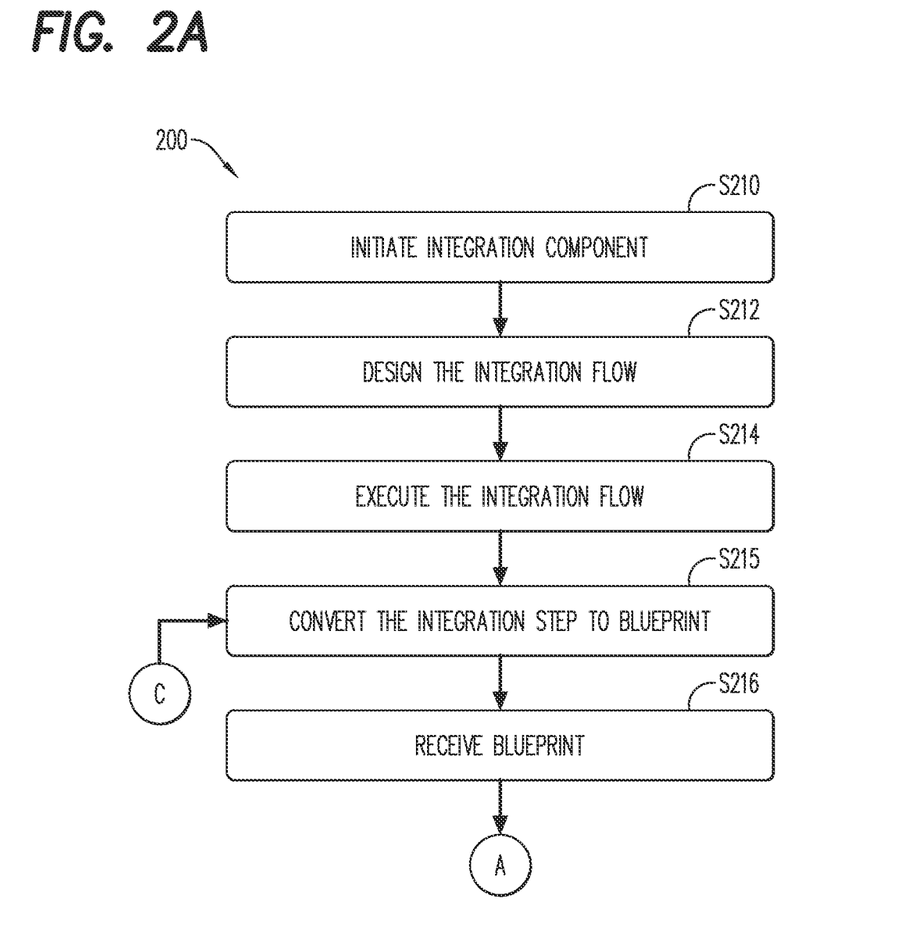
FIGS. 2A-2C are a flow diagram according to some embodiments.
Figure 2B:
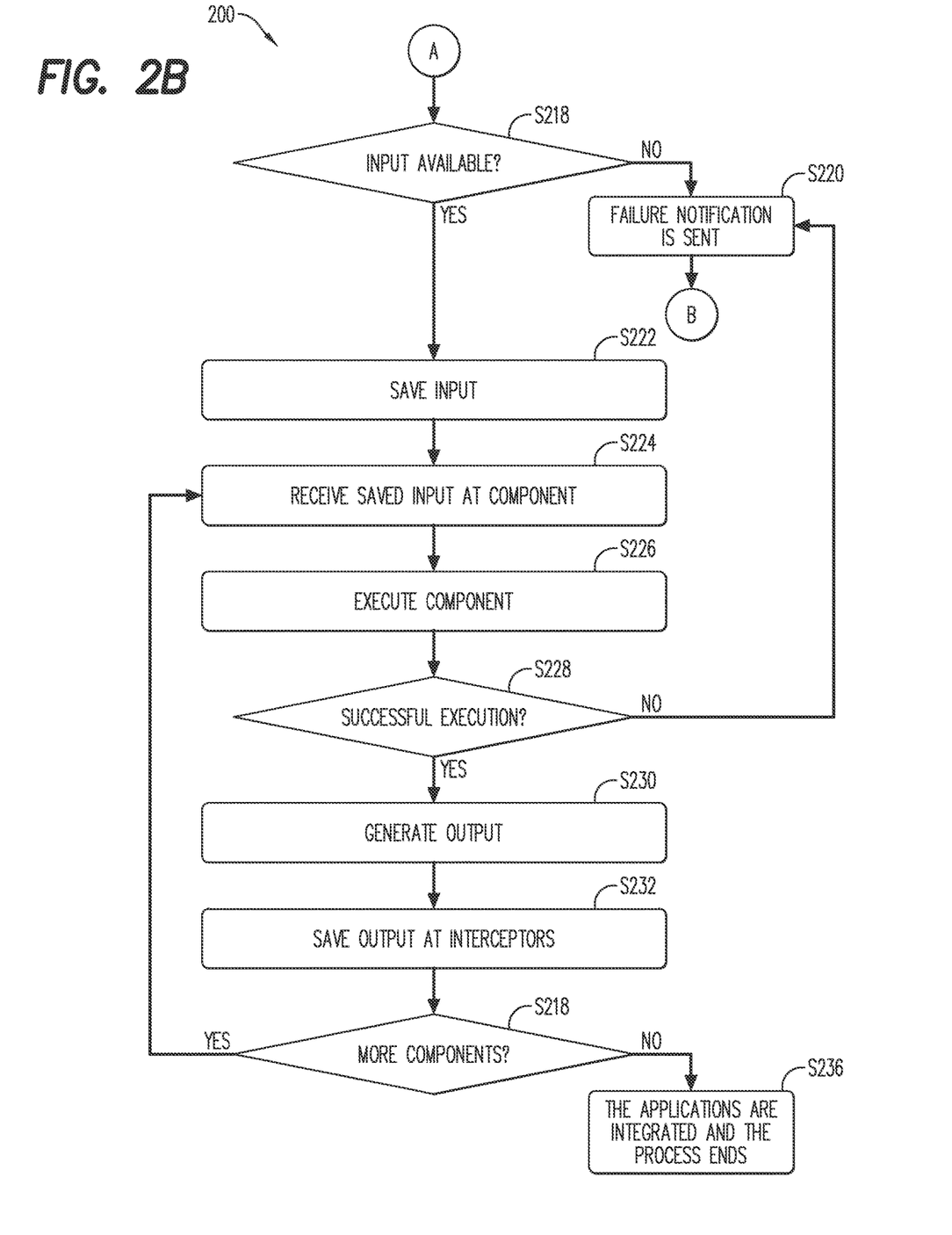

A first step in in execution of the blueprint 148 is determining whether a first input 414 is available for receipt by a first component 406 at S218. In a case that the first input 414 is not available for receipt by the first component 406, execution of the blueprint fails (is unsuccessful), and the process 200 proceeds to S220, as described further below. In a case that the first input 414 is available for receipt by the first component 406, first input 414 is saved at a first input/output interceptor 150 at S222 and stored in the data store 110. As described above, the input/output interceptor 150 is code that gets called before input is sent to a component and after output is generated by a component. The input/output interceptor 150 may store data in memory, a database, or other storage medium. Then at S224, the saved first input 414 is received at the first component 406. It is noted that steps S222 and S224 may occur in any order, or may occur at the same time, or substantially the same time. At S226, the first component 406 executes its respective process using the received input 414. It is determined at S228 whether execution of the first component 406 was completed successfully ("complete"). Execution of the first component 406 may be considered to be completed successfully ("complete") when an output 416 is generated. In a case that execution of the first component 406 fails (is "incomplete"/not successful), the process 200 proceeds to S220, as described further below. In a case that execution of the first component 406 is successful, the first component 406 generates a first output 416 at S230. Next, at S232 the first output 416 is saved by a second input/output interceptor 150 and stored in the datastore 110. As described above, the output of one component is the input of a next successive component. Then it is determined at S234 whether more components 406 are available to receive the data. In a case there are no further components, the applications are successfully integrated and the process 200 ends at S236. In a case there are further components, the first output 416 is then received as a second input at a second component 406, and the process 200 returns to S224.

Figure 2C:
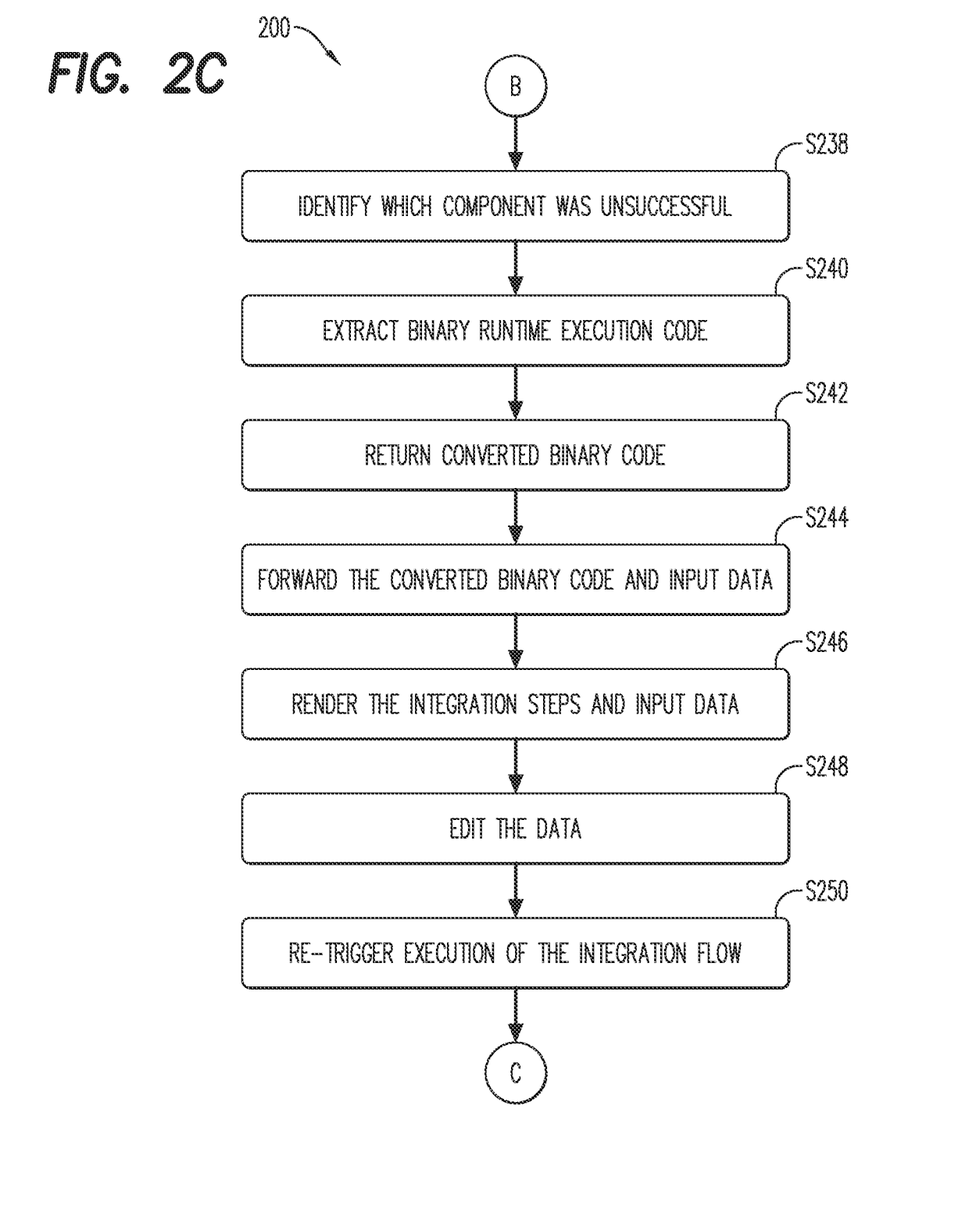
Figure 3:
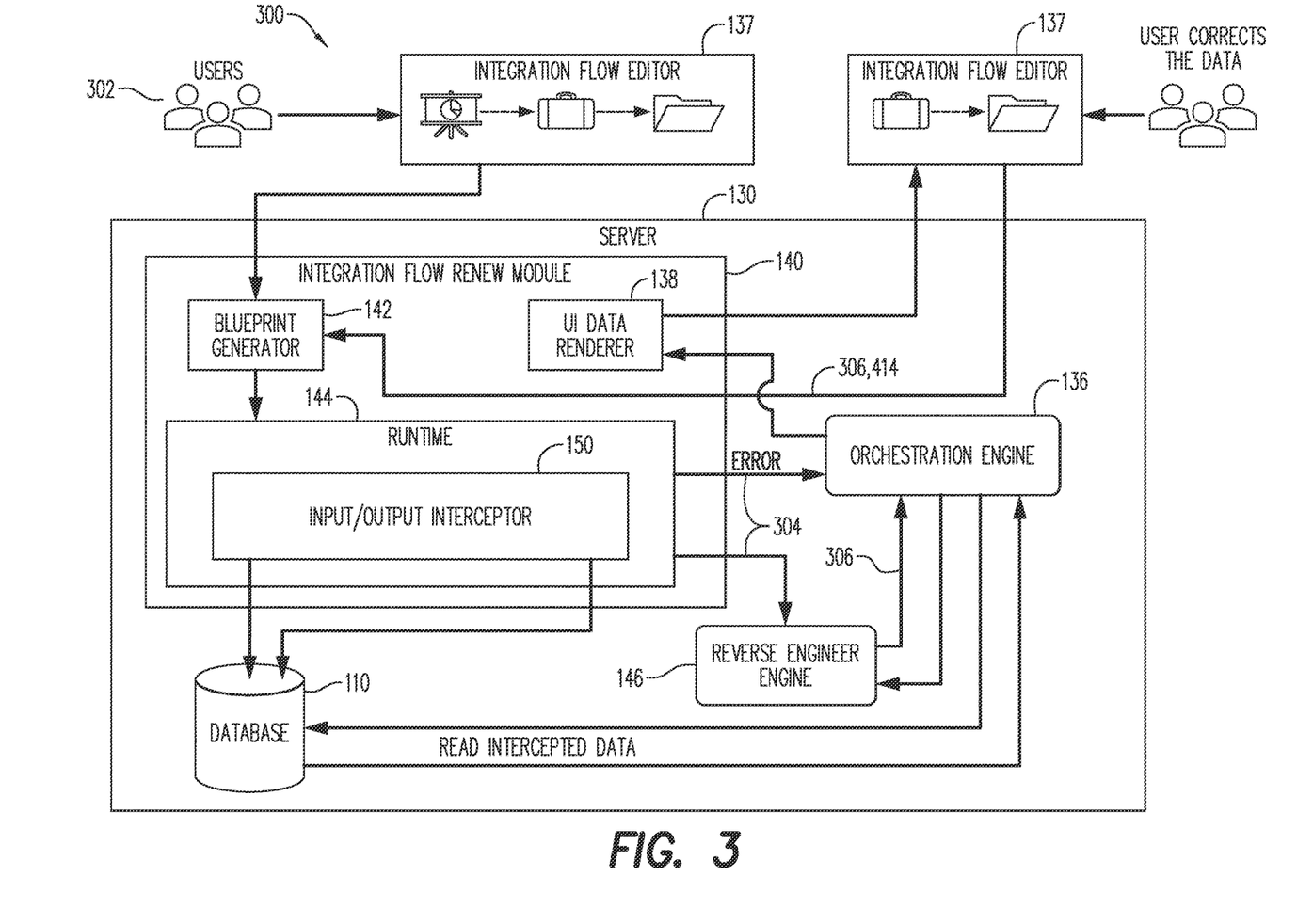
FIG. 3 is a block diagram of a process according to some embodiments.

Turning back to S220 and a case that the execution of the blueprint is incomplete/failed, the runtime component 144 sends notification 304 of the failure to an orchestration engine 136 and a reverse engineer engine 146. The notification 304 may include the Integration Flow Name which failed along with the component that failed. The notification may include other suitable information. It is noted that the runtime may return the jar which contains the binary file to the reverse engineer engine 146. The reverse engineer engine 146 may then use the files inside the jar to construct the blueprint. As described above, execution of the integration steps 404 may fail for reasons including, but not limited to, mandatory data fields are missing, the data is corrupted, the data is encoded in the source system 405 in a format the IF renew module 140 cannot understand, etc. As used herein, "data corruption" does not mean all of the data is bad. Rather, there are some special characters that may not be supported by the UTF-8 encoding standard or other suitable encoding standard. When the data includes these characters, the data may be said to be corrupt. If for example, the data has two fields, and there is a special character that UTF-8 encoding does not support, the Memory Mapping component 406 may not be able to process this data, and the data is "corrupt". It is noted that when any Integration flow component produces data, it makes sure the data is in the correct structure. The cause of the failure may be the data inside the structure. As another non-exhaustive example, there may be XML tags that are always maintained, but the data inside the XML tags may be corrupted, so the entire payload is still intact. The orchestration engine 136 may be a central processing unit that is responsible for orchestrating the operations of reading the intercepted data from the database and determining to which component this data belongs. The orchestration engine 136 also acts as a mediator between the Reverse Engineer Engine and the UI Data Renderer. The orchestration engine 136 identifies the component 406 at which the failure occurred in S238. The identification is based on the data saved by the input/output interceptors 150 and stored at the datastore 110. In some embodiments, when the orchestration engine 136 receives notification 304 of the failure, the orchestration engine 136 retrieves the most recent saved input 414/output 416 from the datastore 110. In embodiments, the data may be saved against the component name, and only the most recent data is saved against the component, so that the saved data is the most recent saved input 414/output 416. The orchestration engine 136 may determine which component 406 failed based on the retrieved data. For example, in a case that a component received the input 414 but there is no output 416 from the component, then that component has failed. In embodiments, the input/output interceptor 150 saving the data against the component name may allow the orchestration engine 136 to determine the data a component should receive.

Figure 5:
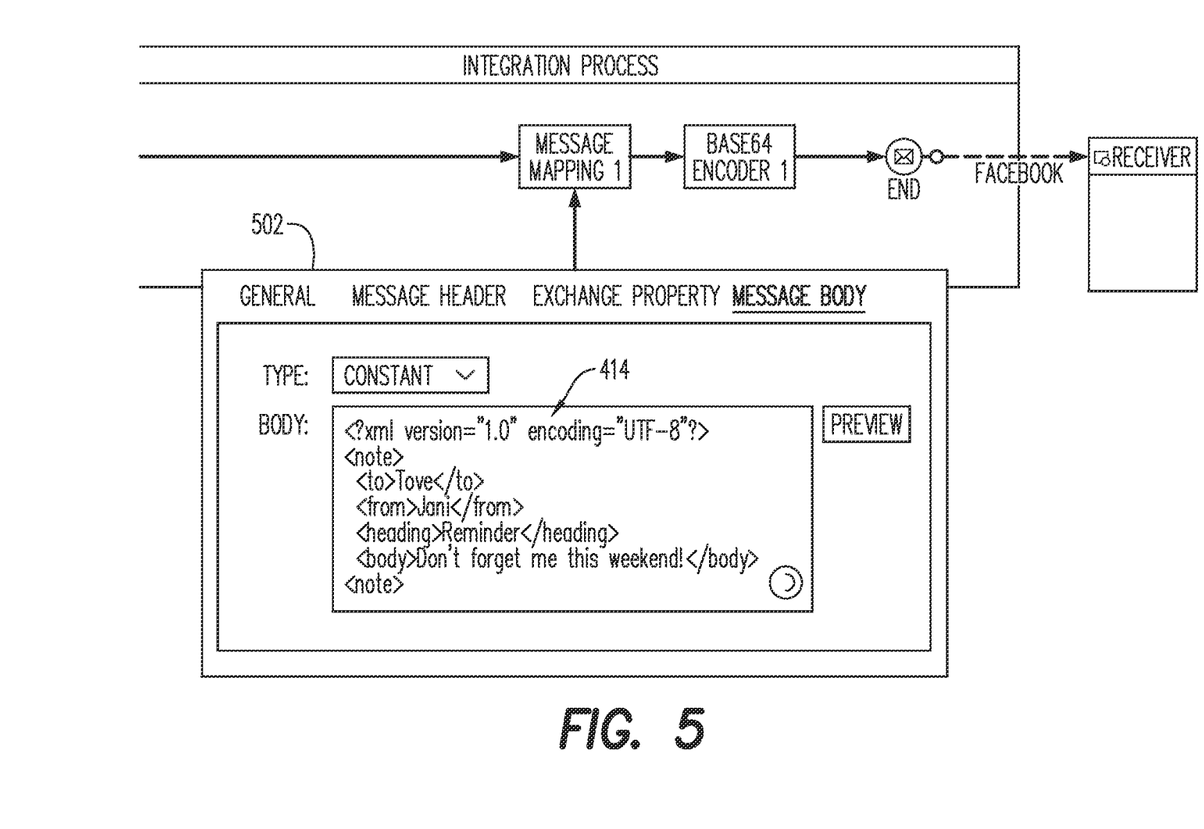
FIG. 5 is a user interface according to some embodiments.

Next in S240, in response to a request (e.g., containing the name of the integration flow that needs to be extracted by the reverse engineer engine) from the orchestration engine 136, the reverse engineer engine 146 extracts the binary code of the blueprint 148 that has not been successfully executed, and converts the binary code back into a code of a same code type as received at the blueprint generator 142 (i.e., code type for the user interface integration steps 404) that can be understood by the Integration flow editor 137. Then the reverse engineer engine 146 returns the converted binary code 306 to the orchestration engine 136 in S242. The orchestration engine 136 then forwards the converted binary code 306 and the input data 414 of the last failed component 406 (most recently saved input) to a User Interface (UI) data renderer 138 in S244. The UI data renderer 138 renders the integration steps 404 and the input data 414 and displays them on the user interface 400 in S246. It is noted that software rendering is the process of generating an image from a model by means of computer software. It is also noted that while the user 302 may only see in the user interface 500 shown in FIG. 5, the integration steps 404 that have not been successfully executed yet, along with the data that caused the failure. This may be to provide a clearer, less encumbered view of the state of the integration flow 404, and in other embodiments, more integration steps may be shown. It is also noted that the extracted data may be presented to the user as a separate entity from the originally displayed integration flow as shown in FIG. 5. It may be desirable to preserve the original integration steps because the user may want to execute it again with different data, so the extracted data is presented to the user for any modification as integration steps in a separate user interface 500. It is noted that while presenting the unexecuted integration steps in a separate user interface may be easier for the user to understand and interact with, the unexecuted integration steps may be provided as part of the original integration steps with other notation to direct the user to failed component.

Next, in S248, the user 302 may edit/change at least one data element of the input data that caused the failure. As a non-exhaustive example, the user may add a missing field to a data set. Then in S250, the user retriggers the execution of the integration flow 402, and the process returns to S215 and the blueprint generator 146 converts the integration steps 404 of the integration flow 402 into a re-generated blueprint 148, and the as of yet unexecuted integration steps are executed using the edited input data.

It is noted that the blueprint 148 is re-generated because the execution now happens from the point where the original execution last failed. As such, the blueprint generator may generate binary code only for the integration steps from the point where the integration flow last failed.

It is noted that in some embodiments the saved input and output produced by each component 406 may be preserved in perpetuity until it is determined to delete the input/output. In this way, a user may revisit the specific data as warranted. It is noted that in some embodiments, all of the saved input/output may not be preserved in perpetuity, and instead, the input/output is stored for only those components that have executed unsuccessfully (failed), as this input is needed for editing by the user. In other words, the input is saved until the component executes successfully. By not saving every input/output, the process may be optimized in terms of time (e.g., there is only one input to be searched for return to the orchestration engine) and storage capacity of the data store.

A non-exhaustive example of the process 200 will now be described with respect to FIGS. 4-5. In this scenario, in S210, the user initiates an integration component 137 to integrate data from the Ariba source system 405 to the SuccessFactor target system 408. In S212, the user designs an integration flow 402, including three integration steps 404, each to be executed by a respective component 406—XML to JSON Converter component 1, Message Mapping 1 component, Base64 Encoder 1 component. The user 302 selects an execution selector (not shown) to execute the integration flow 402 in S214. The integration flow 402 is received at the blueprint generator 142, and is converted into a binary code blueprint 148 at S215. Next, the runtime component 144 receives the blueprint 148 at S216 and executes the integration steps 404 represented by the blueprint 148. In the instant non-exhaustive example, the runtime component 144 determines the first input 414 is available for receipt by a first component 406 at S218, and saves the input 414 at S222. Then at S224, the saved first input 414 is received at the XML to JSON converter 1 component 406. At S226, using the received input, the XML to JSON converter 1 component 406 converts XML received as input to JSON format. At S228 it is determined the XML to JSON converter 1 component was successful. Next, at S232, the first output 416 is saved by the second input/output interceptor 150 and stored in the datastore 110. It is determined at S234 more components 406 are available to receive the data (i.e., Message Mapping 1 component 406 and Base64 Encoder 1 component 406). The above process S210-S226 is then repeated with respect to the Message Mapping 1 component 406, but at S228 it is determined the Message Mapping 1 component 406 has failed. It is noted that the Message Mapping component may be responsible for transforming an input from one form to another. For example, if the received input XML has two fields named "First Name" and "Last name", but the Target system where data needs to be sent accepts XML with field "EmployeeName", then the Message Mapping component may transform the input with two fields to the Target XML with one field. The Message Mapping component may transform XML to JSON, JSON to XML, XML to XML and JSON to JSON, etc. In the non-exhaustive example shown herein, the Message Mapping component accepts JSON as input and transforms it into an XML. The failure may, for example, be a problem with the XML to JSON converter component (e.g., the converter produced the wrong output). The process 200 then progresses to S220 and the runtime component 144 sends notification 304 of the failure to the orchestration engine 136 and the reverse engineer engine 146. The orchestration engine 136 identifies the Message Mapping 1 component 406 as the location of the failure that occurred in S238, as it receives the most recent inputs and outputs from the datastore, and the input for this component was saved, but the output from this component was not saved.

Next in S240, the reverse engineer engine 146 extracts the binary code of the blueprint 148 that has not been successfully executed, and converts the binary code back into the user interface integration steps 404 that can be understood by the integration flow editor 137. Then the reverse engineer engine 146 returns the converted binary code 306 to the orchestration engine 136 in S242. The orchestration engine 136 then forwards the converted binary code 306 and the input data 414 of the Message Mapping 1 component 406 to a User Interface (UI) data renderer 138 in S244. The UI data renderer 138 renders the integration steps 404 and the input data 414 (via a text box 502) on the user interface 500 in S246, as shown in FIG. 5. The conversion may be used because while binary is the language understandable by a machine, the integration framework for integrating the systems/applications may understand data in a certain format, referred to herein as a Blueprint. The integration flow editor, however, may not understand Blueprint, so it has to convert the data into another format (e.g., Business Process Model (BPM) format, in the non-exhaustive example described herein). As such, the data may be converted from BMP to Blueprint to Binary, and vice versa (Binary to Blueprint to BPM). Next, in S248, the user 302 may edit the input data that caused the failure. Then in S250, the user renews the integration by retriggering the execution of the integration flow 402, and the process returns to S215 and the blueprint generator 142 converts the integration steps 404 of the integration flow 402 into a blueprint 148, and execution of the as-yet unexecuted integration steps is performed.

Figure 6:
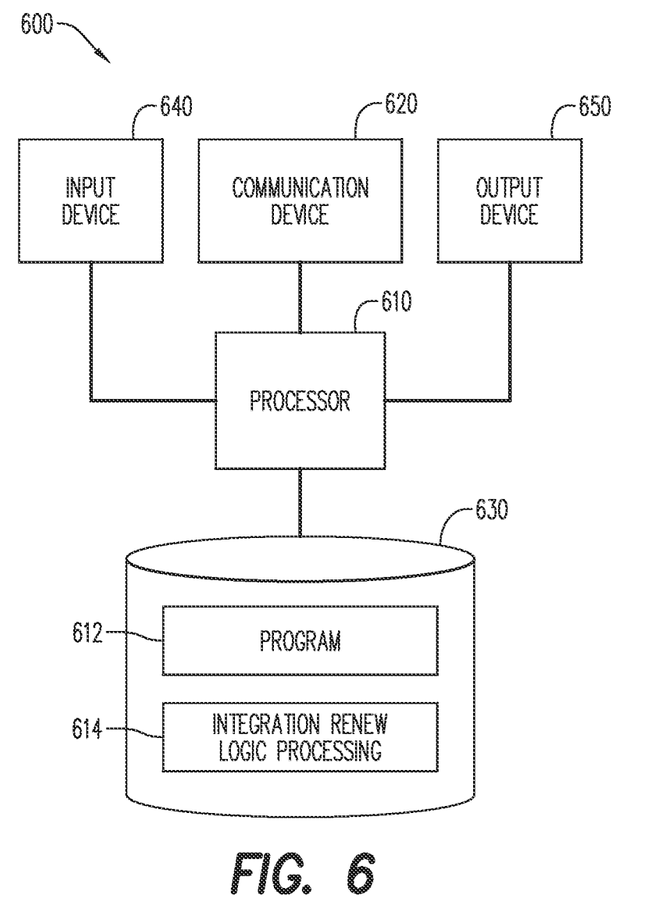
FIG. 6 is a block diagram of a system according to some embodiments.

FIG. 6 is a block diagram of apparatus 600 according to some embodiments. Apparatus 600 may comprise a general- or special-purpose computing apparatus and may execute program code to perform any of the functions described herein. Apparatus 600 may comprise an implementation of one or more elements of system 100. Apparatus 600 may include other unshown elements according to some embodiments.

Apparatus 600 includes an integration renew processor 610 operatively coupled to communication device 620, data storage device 630, one or more input devices 640, one or more output devices 650 and memory 660. Communication device 620 may facilitate communication with external devices, such as application server 130. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device/memory 630 may comprise any device, including combinations of magnetic storage devices (e.g., magnetic tape, hard disk drives and flash memory), optical storage devices, Read Only Memory (ROM) devices, Random Access Memory (RAM) etc.

The storage device 630 stores a program 12 and/or integration renew platform logic 614 for controlling the processor 610. It is noted that program 612 and/or integration renew logic 614 may also be stored and executed from an application server or from any other environment (e.g., software architecture) that can execute software instructions. The processor 610 performs instructions of the programs 612, 614, and thereby operates in accordance with any of the embodiments described herein, including but not limited to process 200. The executable instructions of the programs 612, 614 represent the executable instructions of the software architecture, including implementation of the methods, modules, subsystems and components and so forth described herein and may also include memory and/or storage modules, etc.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
   receiving a set of integration steps to transfer data between a first application and a second application, wherein the set of integration steps includes execution of at least one component;
   transmitting the received set of integration steps to a blueprint generator;
   converting, at the blueprint generator, the received set of integration steps to a binary runtime executable code;
   inserting at least two input/output interceptors into the binary runtime executable code;
   receiving the binary runtime executable code at a runtime component;
   executing the received binary runtime executable code at the runtime component using data,
   in a case that execution of the at least one component is complete, an output of the executed at least one component is saved;
   in a case that execution of the at least one component is incomplete:
      receiving an update to the data;
      re-generating, at the blueprint generator, the binary runtime executable code for one or more an unexecuted integration steps; and
      executing the re-generated binary runtime executable code.

2. The computer-implemented method of claim 1, wherein re-generating the binary runtime executable code is executed from a point when the at least one incomplete component receives the input update.

3. The computer-implemented method of claim 1, wherein the set of integration steps are received as user interface data at an integration flow editor.

4. The computer-implemented method of claim 1, further comprising in the case that execution of the at least one component is incomplete:
   receiving, from the runtime component, a notification of the incomplete execution at an orchestration engine; and
   identifying a component where the execution was incomplete.

5. The computer-implemented method of claim 4, wherein identifying the component where the execution was incomplete further comprises:
   retrieving a most recently saved input and a most recently saved output; and
   determining a given component had an incomplete execution in a case that the given component has an input and no output.

6. The computer-implemented method of claim 4, further comprising:
   extracting the binary runtime executable code that is incomplete; and
   converting the extracted binary runtime executable code into a code of a same code type as received at the blueprint generator.

7. The computer-implemented method of claim 6, further comprising:
   transmitting the converted code from the reverse engineer engine to the orchestration engine;
   receiving the converted code from the orchestration engine at a user interface data renderer;
   rendering the converted code as one or more integration steps; and
   displaying the one or more integration steps on a user interface of the integration flow editor.

8. The computer-implemented method of claim 5, further comprising:
receiving, at the orchestration engine, the most recently saved input;
rendering the received input via the user interface data renderer; and
displaying the rendered input on the user interface of the integration flow editor.

9. The computer-implemented method of claim 1, wherein receiving the update to the input further comprises:
receiving a change to at least one data element received as input ay the at least one component.

10. The computer-implemented method of claim 1, further comprising:
verifying, via the input/output interceptor, the at least one component receives an input.

11. The computer-implemented method of claim 1, further comprising:
prior to executing the received binary runtime executable code, determining whether a first input is available for receipt by a first one of the at least one component; and
in a case that the first input is available, saving the input.

12. A system comprising:
a source system and a target system;
an integration flow renew module;
a computer memory storing processor-executable process steps; and
an integration flow renew computer processor coupled to the computer memory, and in communication with the integration flow renew module and operative to execute the processor-executable process steps to cause the system to:
receive a set of integration steps to transfer data between a first application of the source system and a second application of the target system, wherein the set of integration steps includes execution of at least one component;
transmit the received set of integration steps to a blueprint generator;
convert, at the blueprint generator, the received set of integration steps to a binary runtime executable code;
insert at least two input/output interceptors into the binary runtime executable code;
receive the binary runtime executable code at a runtime component;
execute the received binary runtime executable code at the runtime component using data,
in a case that execution of the at least one component is complete, an output of the executed at least one component is saved;
in a case that execution of the at least one component is incomplete:
receive an update to the data;
re-generate, at the blueprint generator, the binary runtime executable code for one or more an unexecuted integration steps, wherein re-generation is executed from a point when the at least one incomplete component receives the input update; and
execute the re-generated binary runtime executable code.

13. The system of claim 12, wherein the set of integration steps are received as user interface data at an integration flow editor.

14. The system of claim 12, further comprising processor-executable process steps to cause the system to, in the case that execution of the at least one component is incomplete,
receive a notification of the incomplete execution at an orchestration engine; and
identify a component where the execution was incomplete.

15. The system of claim 14, wherein identifying the component where the execution was incomplete further comprises processor-executable process steps to cause the system to:
retrieve a most recently saved input and a most recently saved output; and
determine a given component had an incomplete execution in a case that the given component has an input and no output.

16. The system of claim 14, further comprising processor-executable process steps to cause the system to:
extract the binary runtime executable code that is incomplete; and
convert the extracted binary runtime executable code into a code of a same code type as received at the blueprint generator.

17. The system of claim 12, further comprising processor-executable process steps to cause the system to:
prior to execution of the received binary runtime executable code, determine whether a first input is available for receipt by a first one of the at least one component; and
in a case that the first input is available, save the input.

18. A non-transitory computer-readable medium storing program code, the program code executable by a computer system to cause the computer system to:
receive a set of integration steps to transfer data between a first application and a second application, wherein the set of integration steps includes execution of at least one component;
transmit the received set of integration steps to a blueprint generator;
convert, at the blueprint generator, the received set of integration steps to a binary runtime executable code;
insert at least two input/output interceptors into the binary runtime executable code;
receive the binary runtime executable code at a runtime component;
execute the received binary runtime executable code at the runtime component using data,
in a case that execution of the at least one component is complete, an output of the executed at least one component is saved;
in a case that execution of the at least one component is incomplete:
receive an update to the data;
re-generate, at the blueprint generator, the binary runtime executable code for one or more an unexecuted integration steps, wherein re-generation is executed from a point when the at least one incomplete component receives the input update; and
execute the re-generated binary runtime executable code.

19. The non-transitory computer-readable medium of claim 18, further comprising program code to cause the system to, in the case that execution of the at least one component is incomplete,
receive a notification of the incomplete execution;
retrieve a most recently saved input and a most recently saved output; and determine a given component had an incomplete execution in a case that the given component has an input and no output.

20. The non-transitory computer-readable medium of claim 18, further comprising program code to cause the system to:

prior to execution of the received binary runtime executable code, determine whether a first input is available for receipt by a first one of the at least one component; and in a case that the first input is available, save the input.

* * * * *